July 14, 1936.   S. S. CRAMER   2,047,820

HELICAL GEAR AND PROCESS OF MAKING SAME

Filed Jan. 23, 1935

INVENTOR
Stanley S. Cramer
BY
A. D. T. Libby
ATTORNEY

Patented July 14, 1936

2,047,820

UNITED STATES PATENT OFFICE 2,047,820

HELICAL GEAR AND PROCESS OF MAKING SAME

Stanley S. Cramer, Haddon Heights, N. J., assignor to Radio Condenser Company, Camden, N. J.

Application January 23, 1935, Serial No. 3,042

4 Claims. (Cl. 74—437)

This invention relates to improvements in the construction of a helical gear.

As far as I am aware, it has been the universal practice in the past to make helical gears by a hobbing or milling operation, and in certain cases a plurality of operations are required. For example, a roughing operation is performed with gear-shaper cutters made to the desired helix angle, and then a finishing operation either by milling or grinding.

Helical gears made in the usual way as above indicated, are too expensive for some uses, especially where this use is on devices made in large quantity in a highly competitive market. Therefore, the principal object of my invention is to provide a helical gear which is suitable for this class of work, as well as for some other classes of work, and which can be blanked and formed by punch and die operations. I have found that with a suitable punch and die, I can form all of the teeth on the blank or disc all at the same time; that is, on one stroke of a punch press carrying the punch and die. By punching all of the teeth simultaneously, the cost of the gear is reduced to a minimum, as it eliminates the more costly hobbing or milling operations. In addition, the punching operation as disclosed herein, assuming of course that the punch and die are properly made, produces a gear that will have a smooth and quiet action.

My improved type of gear will be readily understood by reference to the annexed drawing, wherein.

Figure 1:
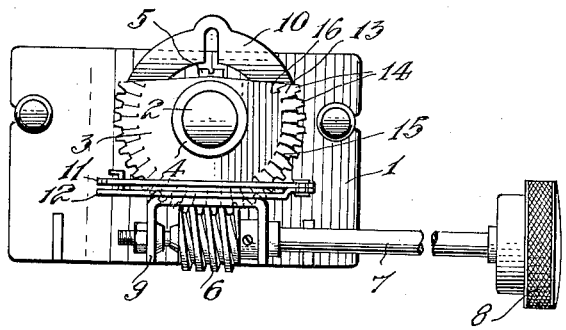
Figure 1 shows one of the uses for a cheaply constructed gear, but one in which a smooth and quiet operation is necessary.

In order to show one application of my improved type of helical gear, I have chosen to illustrate it in connection with a variable tuning condenser used in radio receiving sets. In Figure 1, 1 is a front end plate of an electrical condenser having an operating shaft 2 for carrying the rotor plates of the condenser. The gear 3 is provided with a collar 4 extending, to which the gear 3 is fastened in any satisfactory manner. The collar 4 extends rearwardly and has a set screw 5 for securely fastening the gear 3 to the shaft 2. As indicated in Figure 1, the gear 3 is adapted to mesh with a worm wheel 6 carried on a shaft 7 that is operated by a control knob 8. The worm 6 is supported in a carrier frame 9 through which a portion of the gear 3 projects into mesh with the worm 6.

Carried by the front plate 1 is a yoke member 10 having cooperating members 11 and 12, but since these members form no part of the present invention, they need not be further described herein except that it may be mentioned that the teeth on the gear 3 must be so constructed as to mesh accurately with the worm 6 so as to give quiet and smooth operation of the condenser. As shown in Figure 1, the gear 3 comprises only a major portion of a circle, as the rotor of such an electrical condenser is only required, under usual conditions of operation, to turn 180°, so a full circumference is not required in the device illustrated.

Figures 2, 3:
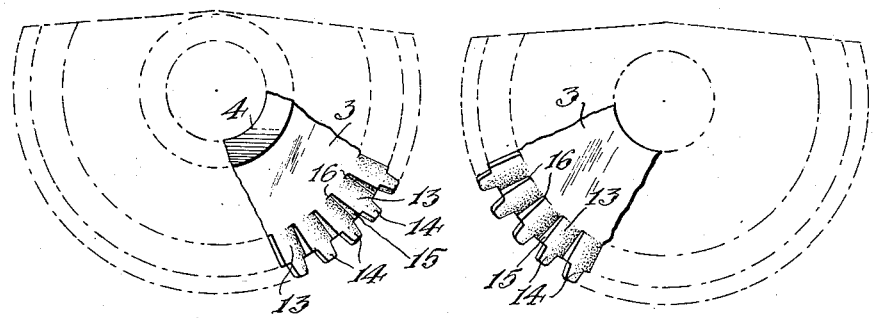
Figure 2 is an enlarged view of a sector of the gear shown in Figure 1, looking at one face thereof.
Figure 3 is a view similar to Figure 2, but looking at the sector from the opposite side.
Figure 4:
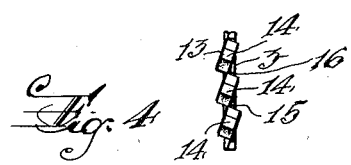
Figure 4 is a view of the sectors shown in Figures 2 and 3, looking at the ends of the teeth.

In my process of constructing the gear 3, I have provided a punch and die so that with one stroke of the press the metal at the outer periphery of the disc 3 is formed and offset in the manner shown in Figures 2, 3 and 4. It will be noted by reference to these figures that the teeth are all formed or punched simultaneously. Each tooth comprises a portion 13 which is offset and/or twisted to the desired predetermined angle. The body portions of the teeth 13 terminate in outer spaced parts 14 which comprise the engaging parts of the teeth. The outer parts 14 may therefore be really termed the teeth proper. Preferably in the process of forming the body or base portions 13 of the teeth, these portions are preferably united by metal 15; that is to say, the portions 13 are preferably not severed one from the other, but are in reality integral, the metal being operated on down to some point 16. As a matter of fact, this operation actually stiffens the outer rim of the gear.

In the process of forming the engaging part 14 of the teeth, the edges are slightly rounded by the forming punch and die, so that there are no sharp cutting edges or burrs, thereby insuring smooth and quiet operation of the gear.

By this process of construction, I have obtained a helical gear which is the cheapest kind of a gear to manufacture, yet one which attains the commercial objects specified.

What I claim is:

1. A gear having portions of its rim offset and twisted to a predetermined angle, the outer parts of said portions terminating in cut away spaced teeth of the desired form.

2. A gear having portions of its rim offset and twisted to a predetermined angle without separation of said portions, the outer parts of which terminate in formed spaced teeth.

3. A helical gear, all the teeth of which constitute the cut away ends of offset and twisted but non-separated portions of the rim of a gear blank.

4. A gear having its rim partially slit and twisted at a plurality of points, the extreme outer portions of said slit and twisted parts being cut away to form teeth thereon.

STANLEY S. CRAMER.